Oct. 14, 1924.
J. M. WEED
ELECTRICAL APPARATUS
Filed July 15, 1920
1,511,694
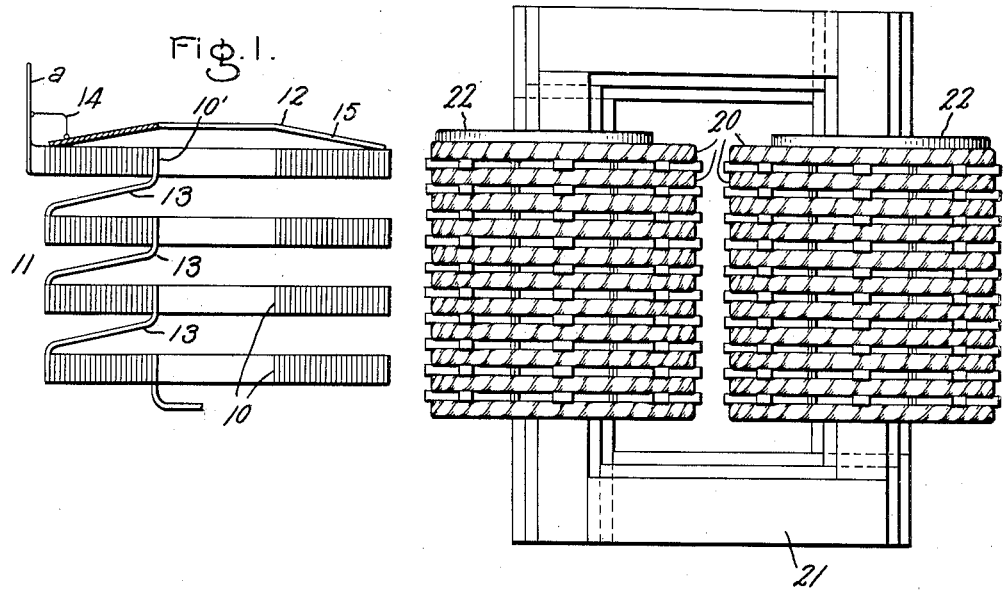
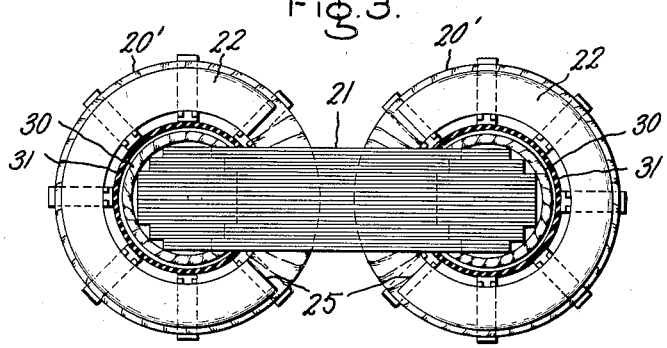
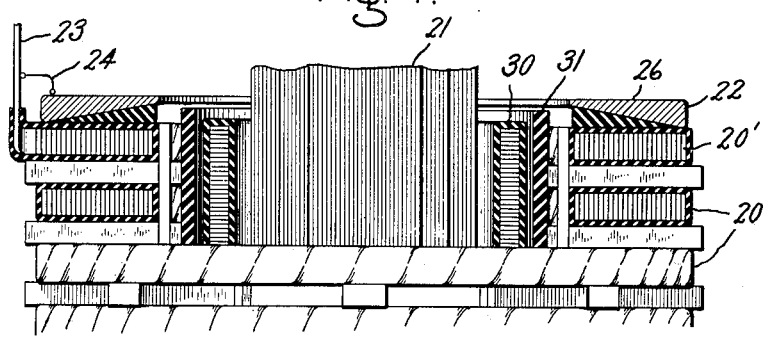
Inventor:
James M Weed,
by *his attorney*
His Attorney.

Patented Oct. 14, 1924.

1,511,694

UNITED STATES PATENT OFFICE.

JAMES M. WEED, OF SCHENECTADY, NEW YORK, ASSIGNOR TO GENERAL ELECTRIC COMPANY, A CORPORATION OF NEW YORK.

ELECTRICAL APPARATUS.

Application filed July 15, 1920. Serial No. 396,585.

*To all whom it may concern:*

Be it known that I, JAMES M. WEED, a citizen of the United States, residing at Schenectady, county of Schenectady, State of New York, have invented new and useful Improvements in Electrical Apparatus, of which the following is a specification.

My invention relates to electrical apparatus, such as transformers, reactors and the like, and has for its general object an improved arrangement of parts for securing a substantially uniform voltage distribution in the windings.

More particularly my invention relates to windings provided with protecting end plates of the general type shown in United States Letters Patent to W. S. Moody, No. 1,019,512. A specific object of my present invention is to secure a more uniform initial voltage distribution in such a winding with end plates when a voltage is suddenly impressed at its terminals.

When a voltage is suddenly impressed at the terminals of a winding, as by the closing of a switch or by lightning, an instantaneous distribution of the voltage through the winding is effected through the medium of its capacitance. The capacitance of the winding consists of the entire series and parallel arrangement of capacity elements existing throughout the winding from one terminal to the other, including capacity from the winding to ground and capacity from one part of the winding to another. The charging of the various capacity elements to the respective potentials corresponding to the initial voltage distribution is effected by current which does not flow along the winding, or through its inductance, but only through other series elements of capacitance. If the initial voltage distribution thus produced is not uniform with respect to the turns, subsequent and more gradual changes begin immediately in an effort to establish such uniform distribution. These changes are effected by currents flowing along the winding, transferring charges from one capacity element to another through the inductance of the winding. As is well known, such a flow of current between capacity elements through inductance results in oscillations, the current surging back and forth, with alternating voltages between the parts of the windings concerned.

Any sudden change of voltage at the terminals of a winding produces results such as described above. This will be understood by considering the change of voltage as a new sudden voltage, positive or negative as the case may be, superposed upon the voltage which preceded it. The resultant voltage distribution is that found by superposing the distribution due to the new voltage upon that due to the preceding voltages. If successive voltage changes occur in synchronism with, or as a multiple or sub-multiple of the natural frequency of the oscillations referred to above, the resulting internal voltages between adjacent portions of the winding, or from the winding to ground, may be much greater than those produced by a single voltage impulse. Dangerous transient internal voltages may thus be produced either by a single large sudden change of voltage at the terminals, or by a succession of smaller changes. These dangerous voltages and oscillations will not occur, however, if the initial voltage distribution, due to capacitance, is uniform with respect to the turns. This is in accordance with the principle, which I have discovered and set forth in my copending application Serial No. 354,896, filed January 29, 1920, that if the capacitance associated with the inductance of any winding be disposed in such a manner that the potential gradient which would be produced by the capacitance alone is the same as that which would be produced by the inductance alone, then no transient excess voltages or oscillations will be produced.

In an ordinary winding such as is here considered, without the end plates, the initial voltage distribution, produced in the manner explained above, places a large percentage of the total voltage across those portions of the winding which are near to the terminals, the maximum voltages appearing across the end turns. The use of end plates electrically connected to the terminals as described in Patent No. 1,019,512 mentioned above, in addition to affording the external protection there described, effects a modification of the initial internal voltage distribution, by virtue of the added capacitance which occurs between the plate and the various turns of the winding. The voltages across the end portions of the winding thus affected are reduced, although with a flat end plate adjacent to a flat end coil, as described in that patent, the voltage distribution still is far from uniform.

When applying end plates in accordance with my invention, I so arrange the shape and position of the end plate with respect to the various turns of the end portion of the winding that when a voltage is suddenly impressed at the terminals the initial voltage distribution throughout these turns will be approximately uniform.

For a more complete understanding of the nature and objects of my invention reference should be had to the following detailed description taken in connection with the accompanying drawing in which:

Fig. 1 is a diagrammatic showing of a winding protected by an end plate in accordance with my invention; Fig. 2 shows a transformer provided with an end plate constructed in accordance with my invention; while Figs. 3 and 4 show further details in the construction of this transformer.

Referring now to the drawing, 10 denotes disc coils composing a winding 11 which has a conducting end plate 12 arranged according to my invention across the top of the first coil 10′, the coil 10′ being connected to the line through the terminal indicated at $a$.

The winding 11 is here shown as composed of coaxial spirally wound units or coils in which the turns progress from the outside to the inside; the series connections between the coils being shown at 13.

The end plate 12 mounted on coil 10′ is conductively connected to the terminal $a$ by means of connection 14. This end plate is shown as having a generally conical configuration while the coil is flat. With this arrangement the capacitance of the element of the plate surface which is directly above or associated with a given turn of coil 10′ is in inverse proportion to its distance from the outside turn or terminal, while the inductance measured from the terminal is directly proportional to that distance. The potential of the turn which would result from the capacitance alone is that corresponding to the voltage distribution which would be produced by the inductance alone. The end plate 12 extends substantially around the whole top of the coil 10′, save for the split indicated at 15 to prevent the circulation of eddy currents.

In Fig. 2 the invention is shown as applied to an actual transformer. Here a stack of interleaved disc coils 20 is shown on each leg of the core 21. On the top coil 20′ of each stack is an end plate 22 shaped to embody my invention.

The end plate 22 has a conical taper between it and the top face of the coil 20′ so as to properly proportion the elements of capacitance to the turns as explained above. The space between the plate 22 and the top face of coil 20′ has insulating material inserted therein. This material may be a conical annulus on which the plate 22 rests or it may comprise a number of insulating wedges, such construction being illustrated in Fig. 4. Here the coil 20′ is shown as connected to terminal 23 and the plate 22 conductively connected thereto through connection 24.

In a transformer the end plate 22 may well terminate short of the yoke of core 21 as shown at 25 in Fig. 3; the end plate in such instance being somewhat crescent shaped.

The end plate 22, as shown in Fig. 4, is preferably made thicker at the outer edge than on the inner edge in order to provide a flat top surface 26 which may be utilized in mounting and securing the windings in place.

In actual transformers only the high voltage windings are with advantage equipped with end plates; accordingly there is shown in Fig. 4 a low voltage winding 30 without any protecting end plate, such winding being separated from the high voltage winding by the insulating barrier 31.

An end plate, such as I have described, having its capacitance proportioned to the inductance of the top or end coil so that the potential gradient thereacross due to capacitance alone is the same as that due to inductance alone, gives an initial voltage distribution which is uniform with respect to the inductance, the voltage across the various turns being equal. This eliminates dangerous internal voltages from the end coils, which, without the protection of the plates are subjected to the severest stresses.

Having now described an embodiment of my invention which is at present the best means known to me for carrying the same into effect, I would have it understood that this is merely illustrative and that I do not mean to be limited thereby to the precise details shown, nor restricted in the choice of recognized equivalents except as defined in my claims hereunto annexed.

What I claim as new and desire to secure by Letters Patent of the United States, is:—

1. In electrical apparatus, the combination with a winding, of an end plate conductively connected to the end turns of the winding and spaced therefrom, the spacing of said plate from the individual turns of the winding being proportioned to make the potential gradient in said turns due to capacitance between said winding and plate substantially the same as that due to inductance of said winding.

2. In electrical apparatus, the combination with a winding, of an end plate conductively connected to the turns thereof and spaced therefrom, the spacing of said plate from the individual turns of the winding being proportioned to make the voltage distribution across the end turns produced by the capacitance between said winding and plate substantially the same as that produced by the inductance of said winding.

3. In electrical apparatus, the combination with a winding, of an end plate conductively connected to the end turns of the winding and spaced therefrom, the spacing of said plate from the individual turns of the winding being proportioned to electrostatically impress across the end turns substantially the same voltage distribution as that produced by the magnetic flux.

4. In electrical apparatus, the combination with coaxially arranged disc coils, of a conducting end plate disposed across the end coil and conductively connected to the end turn thereof, said plate being spaced at progressively increasing distances from the turns of said end coil.

5. In electrical apparatus, the combination with coaxially arranged disc coils, of a conducting end plate of conical configuration on its lower surface disposed adjacent to the upper surface of the top coil and conductively connected thereto.

6. In electrical apparatus, the combination with coaxially arranged disc coils, of a conducting end plate adjacent to the terminal coil, conductively connected thereto, and having a conical configuration, the slope of the conical surface being proportioned to make the voltage gradient across said top coil due to capacitance alone substantially the same as that due to inductance alone.

In witness whereof, I have hereunto set my hand this 14th day of July, 1920.

JAMES M. WEED.